UNITED STATES PATENT OFFICE.

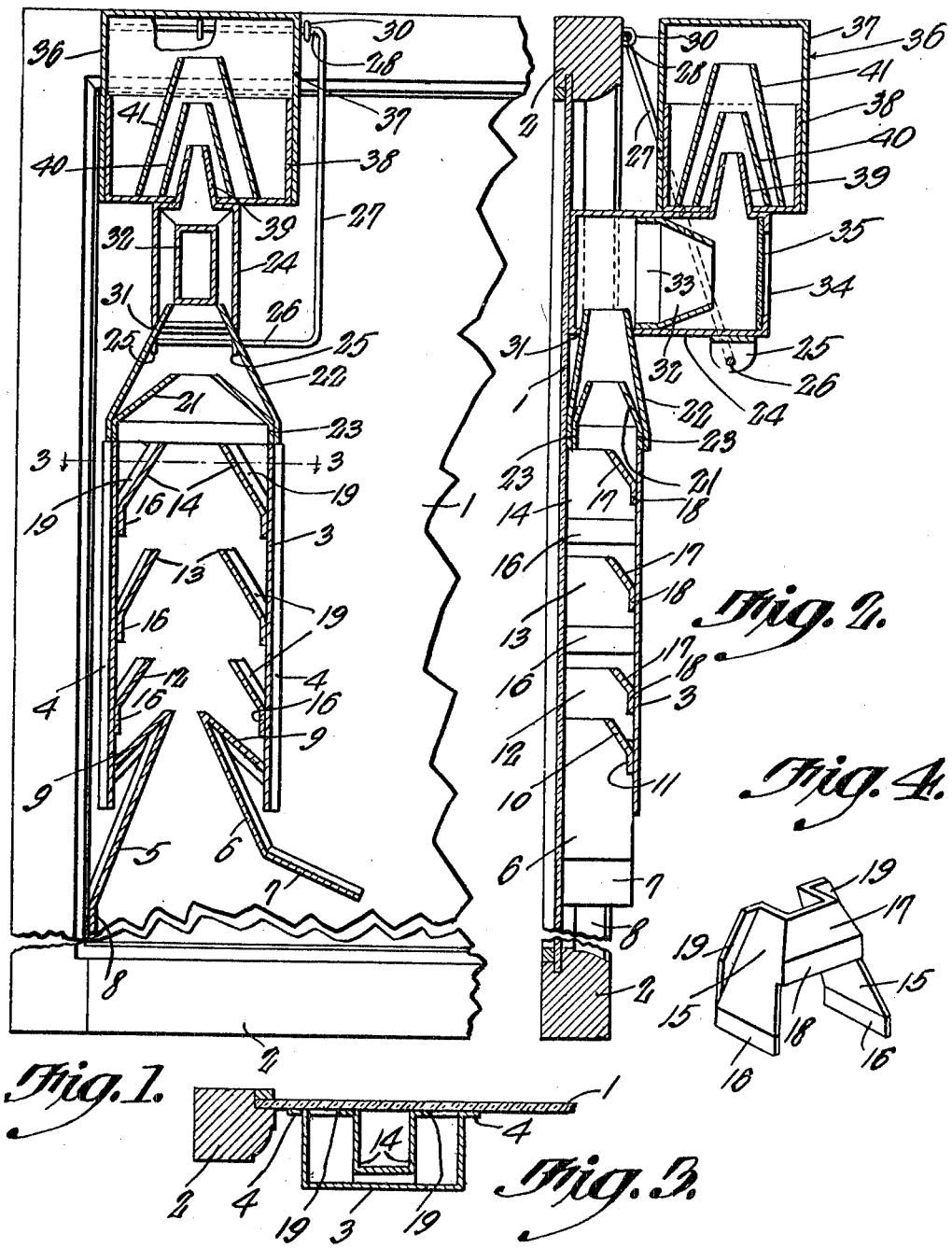

JOSEPH FRITSCH, OF SEDRO WOOLLEY, WASHINGTON.

INSECT AND FLY TRAP.

1,120,046.  Specification of Letters Patent.  Patented Dec. 8, 1914.

Application filed December 9, 1912. Serial No. 735,785.

*To all whom it may concern:*

Be it known that I, JOSEPH FRITSCH, a citizen of the United States, residing at Sedro Woolley, in the county of Skagit and State of Washington, have invented a new and useful Insect and Fly Trap, of which the following is a specification.

One object of the present invention is to provide an insect trap which may be detachably connected with a window pane, so that insects ascending the pane will enter the trap.

Another object of the invention is to provide a trap of the class described from which exit will be difficult.

Another object of the invention is to provide a fly trap having a removable receptacle into which the insects ultimately pass, the construction being such that the receptacle may be removed readily and be destroyed.

Another object of the invention is to provide novel means for assembling the trap with the window frame and with the pane.

The invention aims, further, to improve generally and to increase the utility of, devices of that type to which the present invention appertains.

With the foregoing and other objects in view which will appear as the description proceeds, the invention resides in the combination and arrangement of parts and in the details of construction hereinafter described and claimed it being understood that changes in the precise embodiment of invention can be made within the scope of what is claimed without departing from the spirit of the invention.

In the drawing:—Figure 1 shows the invention in longitudinal section; Fig. 2 is a longitudinal section, the cutting plane in Fig. 2 being at right angles to the cutting plane in Fig. 1; Fig. 3 is a transverse section on the line 3—3 of Fig. 1; and Fig. 4 is a perspective of one leader.

In carrying out the invention there is provided a supporting structure, the same in the present instance comprising a window sash 2, inclosing a pane 1. A primary receptacle 3 is shown, the receptacle being open at its back. The side walls of the primary receptacle 3 are provided along their rear edges with outstanding flanges 4, the flanges 4 being glued or otherwise secured to the window pane 1.

The invention further includes a primary wall 5 and a secondary wall 6, the walls 5 and 6 being disposed in a converging relation, and the upper ends of the walls being disposed in the lower end of the primary receptacle 3. One end of the secondary wall 6 is deflected to constitute a laterally extended, guiding wing 7. The wall 5 may terminate in a foot 8 which may be secured by gluing or otherwise, to one of the uprights of the sash. The upper ends of the walls 5 and 6, within the primary receptacle 3, are bent downwardly, and carried laterally to form supports 9, the ends of the supports 9 being secured to the inner faces of the side walls of the primary receptacle. The upper ends of the walls 5 and 6 are connected by a rearwardly slanting plate 10 having a flange 11 which is secured to the front wall of the receptacle 3 to define a cone. The parts 5, 6, 7 and 9 may be equipped with transverse flanges 11 which may be glued or otherwise secured to the pane 1 of the window. Located within the primary receptacle 3 and above the approaching ends of the walls 5 and 6 are leaders 12, 13 and 14, these leaders being of similar construction. Each of the leaders 12, 13 and 14 comprises slanting side walls 15 terminating in depending flanges 16 which are secured to the side walls of the receptacle 3, and a rearwardly slanted front wall 17 having a flange 18 which is secured to the front wall of the receptacle 3. The side walls 15 are provided with flanges 19 for attachment to the pane 1. At their upper ends, the several leaders 12, 13 and 14 are of cone shape.

The invention further includes a primary cone 21 and a secondary cone 22, within which the primary cone 21 is inclosed, the cone 22 being of greater height than the cone 21, the cones 21 and 22 being provided with upright, connected extensions 23 which, in their turn, are connected to or rest upon, the upper end of the primary receptacle 3. The rear portions of the extensions 23 may be glued or cemented to the window pane 1.

The invention further includes a case 24. The longer dimension of the primary receptacle 3 is vertically disposed, whereas, the longer dimension of the case 24 is horizontally disposed, so that the case 24 and the primary receptacle 3 stand approximately at right angles to each other. The lower portion of the case 24 is equipped with depending ears 25, receiving one arm 26 of a suspension member 27, the upper end of the suspension member 27, terminating in an arm 28, approximately parallel to the arm 26, the arm 28 being removably mounted in staples 30 or the like which are inserted in the upper portion of the sash 2. In the bottom of the case 24 there is an opening 31, and into the opening 31 the upper end of the secondary cone 22 protrudes. Located within the case 24 is a cone 32, the axis of which is coincident with the longer dimension of the case. The cone 32 is provided at its wider end with an extension 33 which is secured to the inner face of the case 24. The apex of the cone 32 is disposed adjacent an opening 34 formed in the outer end of the case 24, the opening 34 being closed by means of a transparent plate 35 which may be removable. The upper portion of the case 24 is equipped with a cone 39.

The invention further includes a receptacle denoted generally by the numeral 36, the receptacle 36 preferably being fashioned from paper, card board or the like, to the end that the receptacle 36 may be removed readily, and be destroyed. The receptacle 36, in the present instance comprises telescopic parts 37 and 38, the part 38 being supported immediately upon the case 24, there being an opening in the bottom of the part 38, through which opening the cone 39 protrudes. Fixed to the bottom of the part 38 and surrounding the cone 39 is a cone 40. Another cone 41 is secured to the bottom of the part 38, the cone 41 surrounding the cone 40. The cones 39, 40, and 41 are of successively increased heights.

In practical operation, the flies or other insects, ascending the pane 1, will encounter the wing 7, the wall 5 or the wall 6, it being understood that the trap hereinbefore described may be positioned at any height upon the pane 1. The members 5, 6 and 7 will serve to direct the insects into the interior of the primary receptacle 3, the lower end of the primary receptacle 3 being closed by the supports 9. Once within the receptacle 3, the insects will ascend the pane 1, owing to the relatively small size of the openings which exist at the upper ends of the leaders 12, 13 and 14. Through the medium of the leaders 12, 13 and 14, and through the medium of the cones 21 and 22, the flies or other insects will be directed into the case 24, the insects traversing in order, the cones 33, 39, 40 and 41, the insects ultimately arriving in the interior of the receptacle 36. When the desired number of insects have accumulated in the receptacle 36, the same may be lifted off the case 24, and be destroyed.

The primary receptacle 3 and associated parts may be fashioned from celluloid, paper, or other inexpensive material, and this construction may be carried out throughout the entire trap, if desired. The suspension member 37 constitutes a means for upholding the case 24 which outstands from the window pane 1, and further, the suspension member strengthens the case 24, so that the same may uphold the receptacle 36. Owing to the plurality of leaders and cones employed, egress from the trap will be extremely difficult, should the insect attempt to retreat from a point between the top and the bottom of the structure.

It will be understood, readily, that the transparent pane 35, which is carried by the case 24 constitutes a means for illuminating the interior of the case 24, so that the insects will enter the case readily from the receptacle 3, the cones 39, 40 and 41 being illuminated through the medium of the pane 35, whereby the insects will traverse readily the cones 39, 40 and 41 and enter the secondary receptacle 36.

Having thus described the invention, what is claimed is:—

1. In a trap of the class described, a horizontally disposed case having a transparent plate in one end, the case being otherwise opaque and having an opening in its top adjacent the plate; a conical leader in the case and having its smaller end disposed toward the plate, the plate constituting means for illuminating the smaller end of the leader and the opening; a destructible receptacle resting upon the top of the case about the opening and supported solely by the case; means for supporting the case independently of the receptacle; and insect guiding means entering the case.

2. In a trap of the class described, a support; a case outstanding horizontally from the support; a bail having approximately parallel fingers, one of which is detachably connected with the support, the other of which extends beneath the case and is detachably connected with the case adjacent the outer end of the case; a receptacle removably mounted upon the top of the case and communicating with the case; and insect guiding means entering the case.

In testimony that I claim the foregoing as my own, I have hereto affixed my signature in the presence of two witnesses.

JOSEPH FRITSCH.

Witnesses:
A. C. EDWARDS,
J. R. BINGHAM.

Copies of this patent may be obtained for five cents each, by addressing the "Commissioner of Patents, Washington, D. C."